Patented Jan. 17, 1950

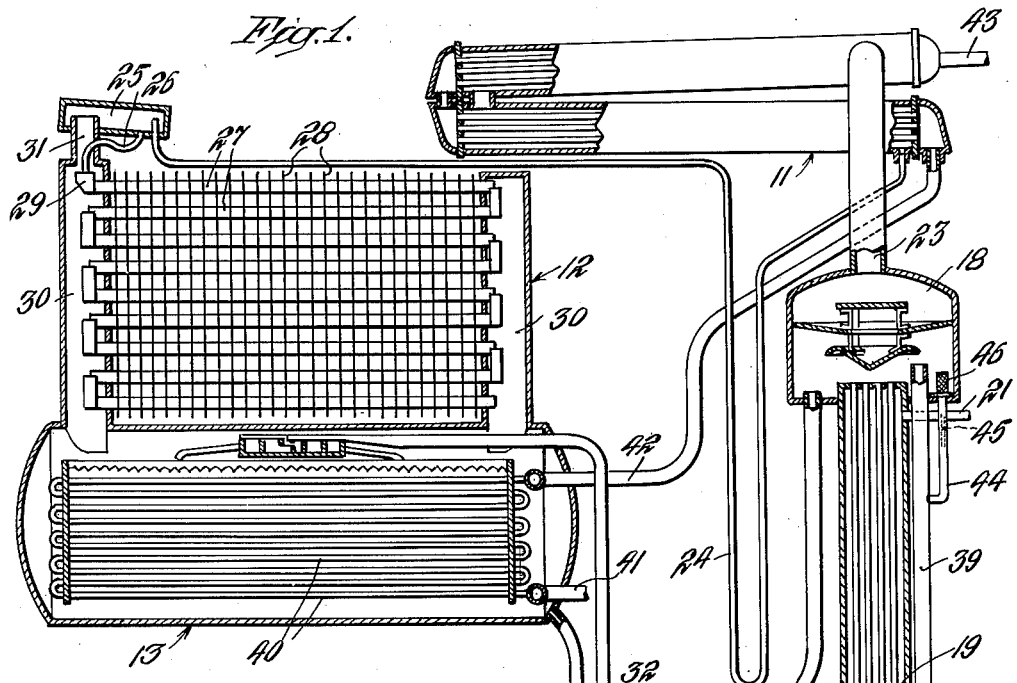

2,494,978

UNITED STATES PATENT OFFICE 2,494,978

REFRIGERATION

Lowell McNeely, Evansville, Ind., assignor to Servel, Inc., New York, N. Y., a corporation of Delaware Application April 4, 1947, Serial No. 739,298

8 Claims. (Cl. 62—119)

This invention relates to refrigeration and more particularly to absorption refrigerating systems of the gravity-flow type.

In operating refrigerating systems of the gravity-flow type, that is, systems wherein refrigerant vapor expelled from a refrigerant-absorbent solution in the generator or vapor expeller is utilized to lift absorption solution to an elevation from whence such solution flows through the absorption solution circuit by gravity, it is found that the generator will often operate more steadily if its pumping rate is increased. Also, in some instances, a better analysis of the expelled refrigerant vapor may be effected by increasing the pumping rate of the generator. However, if nothing more is done, increasing the pumping rate of the generator also increases the rate of circulation of solution in the absorption solution circuit, which increase in circulation may be detrimental to the operation of the refrigerating system as a whole. Increasing the circulation of absorption solution may, for instance, overload the liquid heat exchanger, in which case an excessive amount of hot absorption solution will be passed to the absorber.

It is, therefore, an object of this invention to provide an improved refrigerating system of the absorption type wherein the generator is allowed to operate at its optimum pumping rate without passing too much absorption solution to and through the absorber of such system.

It is a further, and equally important, object of this invention to control the flow of absorption solution from the generator to the absorber in a manner that the rate of flow, though optimum, is not constant, but is a function of operating conditions of the refrigerating system.

In accordance with this invention, the above objects are accomplished by providing an improved refrigerating system of the type described wherein a measured quantity of absorption solution pumped by the generator is returned thereto without passing to the absorber, and wherein this measured quantity of solution that is returned to the generator is controlled in a manner that solution will be delivered from the generator to the absorber at the optimum rate, which rate varies in accordance with operating conditions of the refrigerating system.

The invention, together with the above and other objects and advantages, is set forth in more technical detail in the following description and accompanying drawing, wherein:

Fig. 1 is a view diagrammatically illustrating an absorption refrigerating system embodying the invention; and Fig. 2 is an enlarged detail view, partly in vertical section, of an upper part of the generator shown in Fig. 1.

For purposes of illustration, I have incorporated my invention in a two-pressure absorption refrigeration system generally like that described in U. S. Patent to A. R. Thomas and P. P. Anderson, Jr., No. 2,282,503 granted May 12, 1942. A system of this type operates at low pressures and includes a generator or vapor expeller 10, a condenser 11, an evaporator 12, and an absorber 13 which are interconnected in such a manner that flow of fluids between the high and low pressure sides of the system is maintained by liquid columns. The disclosure in the aforementioned Thomas and Anderson patent may be considered as being incorporated in this application, and, if desired, reference may be had thereto for a detailed description of the refrigeration system.

The generator 10 includes an outer shell 15 within which are disposed a plurality of vertical riser tubes 16 having the lower ends thereof communicating with an inlet chamber 17 and the upper ends thereof projecting into and above the bottom of a separating vessel 18. A space 19 within shell 15 forms a steam chamber about the tubes 16 to which steam is supplied from a suitable source through a conduit 20. The space 19 provides for full length heating of tubes 16, a vent 21 being provided at the upper end of shell 15. A conduit 22 is connected to the lower part of shell 15 for draining condensate from space 19.

The system operates at a partial vacuum and contains a refrigerant-absorbent solution, in which, for example, water is the refrigerant, and a water solution of lithium chloride, lithium bromide or a mixture of the two is the absorbent. When steam is supplied through conduit 20 to space 19, heat is applied to tubes 16 whereby water vapor is expelled from solution. The residue absorption liquid is raised by gas or vapor-lift action with the expelled water vapor forming a central core within an upwardly rising annulus of the liquid. The expelled water vapor rises more rapidly than the liquid with the liquid following along the inside walls of tubes 16.

The water vapor flows upwardly through the tubes or risers 16 into vessel 18 which serves as a vapor separator. Due to baffling in vessel 18, water vapor is separated from raised absorption solution and flows through conduit 23 into condenser 11. The liquid refrigerant formed in the condenser flows therefrom through a U-tube 24 into a flash chamber 25, and from the latter the liquid refrigerant flows through a conduit 26 into evaporator 12.

The evaporator includes a plurality of horizontal banks of tubes 27 disposed one above the other and to which are secured heat transfer fins 28. The liquid flowing to the evaporator is divided in any suitable manner for flow through the uppermost banks of tubes 27. The dividing of liquid may be effected by providing a liquid distributing trough 29 into which the liquid flows from conduit 26. The liquid refrigerant passes through successively lower banks of tubes through suitable end connections which are open to permit escape of vapor from the tubes, and any excess liquid is discharged from the lowermost bank of tubes 27.

The liquid refrigerant supplied to tubes 27 vaporizes therein to produce a refrigerating or cooling effect with consequent absorption of heat from the surroundings, as from a stream of air flowing over the exterior surfaces of the tubes 27 and fins 28. The vapor formed in tubes 27 passes out into end headers 30 which are connected at their lower ends to the absorber. The flash chamber, 25, is provided to take care of any vapor flashing of liquid being fed to the evaporator through U-tube 24. The flashed vapor formed in the initial cooling of the liquid refrigerant flowing from condenser 11 passes from the flash chamber through a conduit 31 into one of the headers 30 and mixes with vapor formed in the evaporator, so that disturbances in the evaporator due to vapor flashing are avoided.

In the absorber refrigerant vapor is absorbed into concentrated absorption liquid which enters through a conduit 32. The diluted absorption liquid flows from the absorber through a conduit 33, a first passage in a liquid heat exchanger 34, a conduit 35, a stabilizing vessel 36 and a conduit 37 into inlet chamber 17 of the generator. Water vapor is expelled out of solution in the generator by heating, and the residue absorption solution is pumped by gas or vapor-lift action through riser tubes 16 into vessel 18, as explained above.

The absorption liquid in vessel 18 is concentrated since water vapor has been expelled therefrom in generator 10. This concentrated absorption liquid flows through a conduit 38, a second passage in liquid heat exchanger 34, and conduit 32 into the upper part of absorber 13. This circulation of absorption liquid results from the raising of liquid by vapor-lift action in riser tubes 16, whereby the liquid can flow to the absorber and return from the latter to the generator by force of gravity. The upper part of vessel 36 is connected by a vent conduit 39, to be referred to in more detail hereinafter, to vessel 18, so that the pressure in vessel 36 is equalized with the pressure in the upper part of the generator and in the condenser.

The heat liberated with absorption of refrigerant vapor in the absorber is transferred to a cooling medium, such as water, for example, which flows upward through a vertically disposed bank of pipe coils 40. The cooling medium enters the lower ends of the pipe coils through a conduit 41 and leaves the upper ends thereof through a conduit 42. Conduit 42 is connected to condenser 11 whereby the same cooling medium is utilized to cool both the condenser and the absorber, and from the condenser the cooling medium flows through a conduit 43 to waste.

In accordance with this invention flow of absorption solution between the generator and absorber is controlled in such a manner that the generator may operate at its optimum pumping rate without passing an excess of solution to the absorber, and in such a manner that the rate of flow of solution to the absorber is a function of operating conditions of the refrigerating system. In the particular embodiment illustrated in the drawing, a by-pass conduit 44, provided with a metering orifice 45 at its upper end, is connected between the bottom of separating vessel 18 and an upper portion of vent conduit 39. A screen 46 is provided at the inlet of by-pass 44 to protect the orifice 45 from foreign matter. As shown in Fig. 1, the lower end of vent conduit 39 projects into stabilizing vessel 36 below the liquid level therein, and this conduit is provided with a plurality of vent openings 47.

In operation, refrigerant vapor is expelled from solution in the generator and the residue or concentrated absorption solution is pumped through the riser tubes into separating vessel 18, as explained above. The concentrated absorption solution collects in the bottom of vessel 18 and a measured quantity of this solution flows through conduit 44 into vent conduit 39, and through this conduit into stabilizing vessel 36. In the stabilizing vessel the concentrated absorption solution mixes with diluted absorption solution flowing into this vessel through conduit 35, and from the stabilizing vessel, the solution flows through conduit 37 into inlet chamber 17 of the generator. The amount of solution that flows from vessel 18 through conduit 39 is controlled by the orifice 45 within this conduit. The concentrated solution pumped into vessel 18 in excess of that which flows through orifice 45, collects in vessel 18 until the level therein is high enough for solution to overflow into conduit 38. Thereafter, solution flows through conduit 38, heat exchanger 34 and conduit 32 into the absorber at varying rates in accordance with the rate at which solution is pumped into vessel 18. As shown, the upper end of conduit 38 projects a short distance into vessel 18 in order that a constant solution level may be maintained over orifice 45. From the above it is seen that the generator may operate at its optimum pumping rate without passing too much solution to and through the absorber. Also, it is seen that the rate of flow of absorption solution to the absorber is not constant but is a function of operating conditions of the refrigerating system.

Having thus disclosed my invention, I wish it understood that I do not wish to be limited to the specific details of construction illustrated and described, for obvious modifications will occur to a person skilled in the art.

I claim:

1. An absorption refrigerating system comprising a generator, a vapor separator, a condenser, an evaporator, an absorber and conduits interconnecting said elements for flow of working media therethrough, said generator including means for pumping absorption solution into said vapor separator, said interconnecting conduits including means connecting said vapor separator and said absorber for conveying absorption solution from the former to the latter at varying rates of flow, and means for returning absorption solution pumped into the vapor separator to the generator at a constant rate of flow.

2. An absorption refrigerating system including a generator, a vapor separator, a condenser, an evaporator, an absorber and conduits interconnecting said elements for flow of a refrigerating medium and an absorption solution, said generator including means for lifting absorption solution into the vapor separator for flow therefrom through one of the above connecting conduits into the absorber, means for maintaining a constant level of absorption solution in said vapor separator, and a by-pass connection between said vapor separator and said generator for returning absorption solution lifted into the vapor separator to the generator at a constant rate of flow.

3. An absorption refrigerating apparatus of the two-pressure type including a generator, a condenser, an evaporator, an absorber and conduits interconnecting said elements for flow of a refrigerating medium and an absorption solution and for regulating flow of fluids between the high and low pressure sides of said apparatus, said generator including means for lifting absorption solution into an upper part thereof from whence said solution flows by gravity into said absorber, and means including a metering orifice for returning absorption solution from the upper part of the generator to the lower part thereof at a constant rate of flow.

4. An absorption refrigerating apparatus including a generator, a condenser, an evaporator, an absorber and conduits interconnecting said elements for flow of working media therethrough, said generator including a lower portion, an upper portion and means for pumping absorption solution from the lower to the upper portion thereof, and said interconnecting conduits including means for flowing absorption solution from the upper part of the generator to the absorber at varying rates of flow and means for returning absorption solution pumped into the upper part of the generator to the lower part thereof at a constant rate of flow, said last-named means including a metering orifice and means associated therewith for maintaining a constant level of absorption solution over said orifice.

5. An absorption refrigerating apparatus of the two-pressure type including a generator, a condenser, an evaporator, an absorber and conduits interconnecting said elements for flow of a refrigerating medium and an absorption solution and for regulating flow of fluids between the high and low pressure sides of the apparatus, said generator including a lower portion, an upper portion and means for pumping absorption solution from the lower to the upper portion thereof, and said interconnecting conduits including means for flowing absorption solution from the upper part of the generator to the absorber at varying rates of flow and means for simultaneously returning absorption solution pumped into the upper part of the generator to the lower part thereof at a constant rate of flow, said last-named means including a by-pass connection between the upper and lower portions of the generator, a flow restrictor in said by-pass connection and means associated with said flow restrictor for maintaining a constant head of absorption solution thereupon.

6. In the art of refrigeration through the agency of an absorption refrigerating system including a generator, a separator, a condenser, an evaporator and an absorber, that improvement which comprises expelling refrigerant vapor from a refrigerant-absorbent solution in the generator, lifting absorbent solution by said expelled refrigerant vapor into said separator from whence said solution may flow by gravity through a primary absorbent solution circuit including the generator and absorber and through an auxiliary absorbent solution circuit, maintaining a constant surface level of absorption solution in the separator, flowing a portion of the lifted absorbent solution from said separator into and through said auxiliary absorbent solution circuit at a constant rate of flow, and flowing the remainder of the lifted absorbent solution from said separator into and through said primary absorbent solution circuit.

7. In the art of refrigeration through the agency of an absorption refrigerating system including a generator, a vapor separator, a condenser, an evaporator and an absorber, that improvement which comprises pumping an excess of concentrated absorption solution from the generator into the vapor separator, flowing a portion of said absorption solution from the vapor separator to the absorber at varying rates of flow, and returning a quantity of the pumped solution to the generator at a constant rate of flow.

8. In the art of refrigeration through the agency of an absorption refrigerating system including a generator, a vapor separator, a condenser, an evaporator and an absorber, that improvement which comprises pumping absorption solution from the generator into the vapor separator by vapor-lift action at a rate that is optimum for operation of the generator but which rate is excessive for optimum operation of the absorber, flowing absorption solution from the vapor separator to the absorber at varying optimum rates of flow, and simultaneously flowing absorption solution from the vapor separator to the generator at a constant rate of flow.

LOWELL McNEELY.

REFERENCES CITED

The following references are of record in the file of this patent:

UNITED STATES PATENTS

| Number | Name | Date |
| --- | --- | --- |
| 2,010,408 | Munters | Aug. 6, 1935 |

FOREIGN PATENTS

| Number | Country | Date |
| --- | --- | --- |
| 459,051 | Great Britain | Dec. 28, 1936 |